(12) United States Patent
Miller

(10) Patent No.: US 7,334,387 B2
(45) Date of Patent: Feb. 26, 2008

(54) ADJUSTABLE SIDEKICK TRIMMER DEVICE MOUNTED ON A TRACTOR OR A LIKE VEHICLE FOR TRIMMING THE EDGES OF A LAWN

(75) Inventor: Arthur J. Miller, Richland, MI (US)

(73) Assignee: MKR Group, LLC, Richland, MI (US)

( * ) Notice: Subject to any disclaimer, the term of this patent is extended or adjusted under 35 U.S.C. 154(b) by 0 days.

(21) Appl. No.: 11/030,921

(22) Filed: Jan. 7, 2005

(65) Prior Publication Data

US 2006/0150603 A1    Jul. 13, 2006

(51) Int. Cl.
*A01D 34/00*    (2006.01)
(52) U.S. Cl. ...................................... 56/12.7
(58) Field of Classification Search ............... 56/10.4, 56/12.7, 13.5–13.8, 14.7, 16.9, DIG. 9
See application file for complete search history.

(56) References Cited

U.S. PATENT DOCUMENTS

| | | | | |
|---|---|---|---|---|
| 4,189,901 A * | 2/1980 | Poettgen | ...................... | 56/10.4 |
| 5,048,276 A * | 9/1991 | Miller | ........................ | 56/16.9 |
| 5,050,372 A * | 9/1991 | Heiskell | ..................... | 56/12.7 |
| 5,167,108 A * | 12/1992 | Bird | ............................ | 56/13.7 |
| 5,226,284 A * | 7/1993 | Meehleder | ................... | 56/11.6 |
| 5,301,757 A * | 4/1994 | Kelley, Jr. | ..................... | 172/15 |
| 5,471,824 A * | 12/1995 | Neely | ........................... | 56/10.4 |
| 5,613,353 A * | 3/1997 | Kugler | ........................ | 56/13.8 |
| 6,256,970 B1 * | 7/2001 | Fleener | ....................... | 56/12.7 |
| 6,397,572 B1 * | 6/2002 | Roundy et al. | .............. | 56/12.7 |
| 6,415,586 B1 * | 7/2002 | Park | ............................ | 56/12.7 |
| 6,430,906 B1 * | 8/2002 | Eddy | ........................... | 56/13.7 |
| 6,457,301 B1 * | 10/2002 | Buss | ........................... | 56/12.7 |
| 6,474,053 B1 * | 11/2002 | Lund | ........................... | 56/13.7 |
| 6,779,325 B1 * | 8/2004 | Robillard, II | ................. | 56/12.7 |
| 6,786,030 B2 * | 9/2004 | Nafziger | ..................... | 56/12.7 |
| 6,892,518 B1 * | 5/2005 | Bares | ......................... | 56/12.7 |

* cited by examiner

*Primary Examiner*—Thomas B. Will
*Assistant Examiner*—Alicia Torres
(74) *Attorney, Agent, or Firm*—Michael L. Greenberg, Esq.; Greenberg & Lieberman, LLC

(57) ABSTRACT

An adjustable sidekick trimmer device (23) having a height that can be set to any deck of a tractor (24) having an adjustable mounting plate (25). The deck belt (14) can be changed without taking the whole system apart upon removal of upper bearing (6) located in trimmer housing (9). Activation of the said device (23) is carried out by pulling a control cable (11), made of steel, suitably connected to that device (23). Pushing a control cable (11) "in" pulls the dual idler pulley (13) disengaging belt (14) from the said trimmer device (23). The acting cable (11) acting as a brake stops belt (14) that runs plurality of cutters (4) and trimmer head (2) when a clutch (10) including a spring (15) is disengaged allowing drive pulley (8) to run freely inside said belt (14).

14 Claims, 18 Drawing Sheets

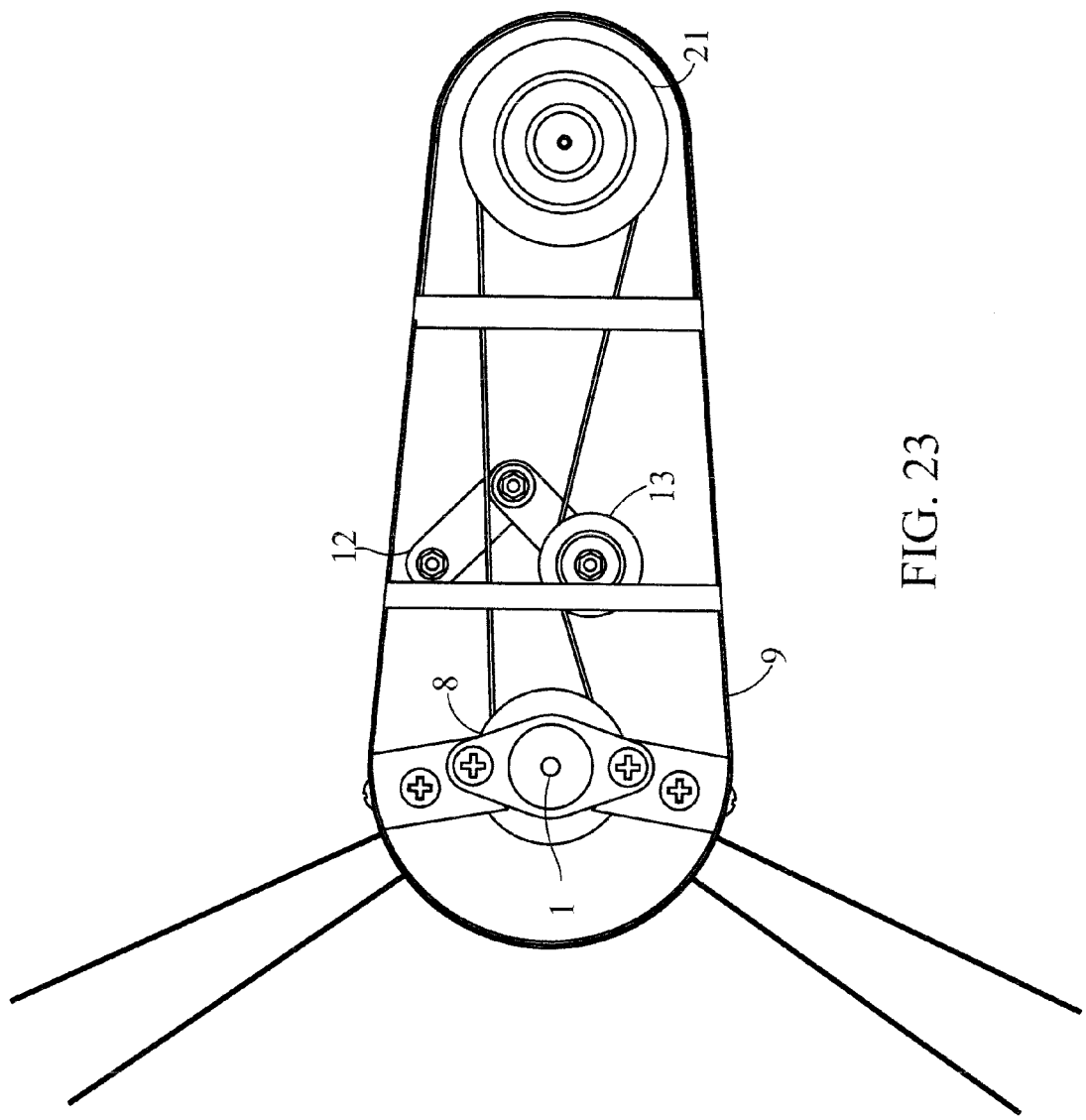

ADJUSTABLE SIDEKICK TRIMMER DEVICE MOUNTED ON A TRACTOR OR A LIKE VEHICLE FOR TRIMMING THE EDGES OF A LAWN

1. FIELD OF INVENTION

The present invention relates to an adjustable sidekick trimmer device and more particularly, to a sidekick trimmer device mounted on a tractor or a like vehicle for trimming the edges of lawn and which is inexpensive, easy to operate and requires little or no maintenance.

2. BACKGROUND OF THE INVENTION

Description of the Related Art

Lawn cutting devices, e.g., sidekick trimmer, edging and trimming assembly, trimmer attachment, hedge trimmer machines etc., heretofore devised and utilized are known to consist basically of familiar and expected structural configurations, notwithstanding the myriad of designs encompassed by the crowded prior art which have been developed for the fulfillment of countless objectives and requirements.

Known prior art lawn cutting devices include U.S. Pat. No. 5,309,701; U.S. Pat. No. 4,965,990; U.S. Pat. No. 4,182,100; U.S. Pat. No. 3,871,160; and U.S. Pat. No. 3,690,384.

GB596283 dated Dec. 31, 1947 to Brett discloses a lawn-mower and/or hedge trimmer of the kind having a rotary cutter co-operating with a stationary member formed with recesses to give a multiple shear effect, comprises at least one rotary blade on the shaft of an electric motor mounted above a cage within which the cutter operates, wherein radial apertures combine with the blade and a base-plate with similarly disposed apertures to give the shear effect, said cage being mounted on removable casters and the device being provided with an adjustable handle. The blade may be adjusted on the shaft. The casters may be adjustable to vary the height of cut.

U.S. Pat. No. 6,094,896 dated Aug. 1, 2000 to Lane depicts a lawn mower lawn trimmer assembly for allowing a user to easily trim weeds and grass while using a lawn mower. This assembly includes a housing with a motor provided in the housing. The motor has a rotating shaft outwardly extending from the housing to which a trimming head is coupled. A mounting assembly is also provided for mounting to the front of a lawn mower. The mounting assembly has a base and a pair of arms. The base is designed for mounting to the lawn mower. Each of the arms is pivotally coupled to the base and to the housing so that the housing is pivotable between a lowered position and a raised position.

DE19740660 dated Mar. 18, 1999 to Burkhard states an electric lawn mower having a fitting at the front right hand side to which a lawn trimmer is clipped. The said lawn trimmer can be unclipped and used to trim the edges of a lawn near to the lawn mower. The trimmer is powered by a rechargeable battery that is recharged when the trimmer is attached to the lawn mower and while the lawn mower is in use. The trimmer also operates while the lawn mower is in use, thereby extending the cutting width of the lawn mower. The recharging process is unaffected by the simultaneous operation of both machines.

U.S. Pat. No. 5,701,728 dated Dec. 30, 1997 to Koka and Reed delineates a lawn mower including a housing having a top wall portion and a generally vertically extending side wall portion. An elongate blade attached to and rotatable with the shaft has a central portion and a pair of end portions, with at least one of the end portions including a cutting edge for cutting vegetation disposed inside of the housing to a first length upon rotation of the blade. A pair of line trimmer assemblies are attached to the blade to provide a pair of filament lines which extend radially outside of the housing to cut vegetation disposed outside of the housing to a second length upon rotation of the blade.

U.S. Pat. No. 5,560,189 dated Oct. 1, 1996 to Payne and Devillier describes a mower assembly for cutting, trimming, and edging a lawn. This device has a trimmer assembly extending laterally of the mower assembly for trimming grass. An edger assembly similarly projects laterally of the mower assembly and includes an edging blade rotating in a vertical plane for cutting grass adjacent a solid object.

U.S. Pat. No. 5,167,108 dated Dec. 1, 1992 to Bird states a power lawn mower that is provided with a trimmer attachment pivotally attached to the mower deck and positioned adjacent a side edge of the deck to trim those areas not accessible to the mower blade. When a fixed obstacle such as a fencepost or tree is encountered, the attachment is rotated on a pivotal support arm against the force of a spring to a position adjacent the rear edge of the mower deck. When the obstacle has been passed, the force of the spring returns the trimmer to the side edge of the mower deck. The trimmer attachment is operated by a drive belt driven from the lawn mower engine and the trimmer attachment support arm includes a pair of overlapping telescoping members and a spring contained in one of the telescoping members to apply an outward force on the other telescoping member resulting in a positive tension being applied to the drive belt. The trimmer attachment may be retracted to the rear edge of the mower deck by operation of a lever mechanism and a link attached to the support arm. A stop member on the mower deck defines a limit of travel for the support arm and continued application of force to the lever causes the telescoping support arm to be shortened and the drive belt to be disengaged from the trimmer head.

U.S. Pat. No. 4,896,488 issued Jan. 30, 1990, discloses a trimmer attachment for a hand-guided lawn mower. The trimmer attachment is rigidly attached to one side of the mower and includes a drive pulley which is driven by a belt engaging a motor-driven pulley. The trimmer can be pivoted from its normal mowing position to a vertical position when the drive belt is removed from the trimmer pulley. Such an arrangement does not lend itself to be readily moved out of the path of an obstacle such as a fence post or the like. It can be pivoted upward when the drive belt is removed and in its pivoted position extends beyond the side of the mower.

U.S. Pat. No. 5,040,360 dated Aug. 20, 1991 to Meehleder describes a motorized lawn mowing machine supported on wheels has a generally horizontal deck with a spindle mounted grass cutter blade below the deck which is rotatable in a generally horizontal cutting plane to cut grass as the machine moves in a forward path of travel. A drive spindle driven by the lawn mower engine protrudes above the deck and mounts a first pulley. Mounted on the deck for swinging movement between an extended operative position in which it extends forwardly and sidewisely angularly from said deck and a vertically raised inboard inoperative position is an auxiliary support having a vertically disposed spindle near its front end with a second pulley thereon. A rotary trimmer disc with flailing cords is mounted on the spindle to rotate in a horizontal plane. An endless drive member is trained around the first and second pulleys and power driven mechanism is connected between the deck and auxiliary support for selectively moving the auxiliary support between operative extended position and an inoperative vertically raised folded position in which the endless member automatically disengages.

Various attachments for conventional lawn mowers, viz., trimmers or like device, and the like are known and exemplified in the following patents:

U.S. Pat. No. 3,236,037 Porterfield
U.S. Pat. No. 3,531,922 Hansen
U.S. Pat. No. 3,782,085 Parker et al
U.S. Pat. No. 4,170,099 Owens
U.S. Pat. No. 4,453,372 Remer Some of these patents, such as the U.S. Pat. No. 4,170,099 to Owens, show a vertically disposed, flailing disc which can be raised to an inoperative position, but its drive depends on the presence of a horizontal flailing disc which cannot be raised. In the U.S. Pat. No. 4,453,372 to Remer, a flexible, cable type drive is used to drive the edger or trimmer, which is movable from an operating position to a disengaged position on a multi-positional boom via a ball and socket mounting arrangement.

U.S. Pat. No. 4,453,372 to Remer, U.S. Pat. No. 4,170,099 to Owens, U.S. Pat. No. 3,531,922 to Hansen, and U.S. Pat. No. 3,236,037 to Porterfield are among a group of patents which show attachments driven from pulleys or friction drives located within the skirt of a rotary mower, which location makes their drives subject to clogging and slippage caused by the accumulation of cuttings. Some other patents avoid this problem by taking drive from above the cutting skirt area, as shown for example in U.S. Pat. No. 4,242,855 to Beaver, U.S. Pat. No. 3,871,160 to Hooper, U.S. Pat. No. 3,604,208 to Borunda, and U.S. Pat. No. 3,407,579 to Decker.

Disclosures show various mountings for the cutter to the trimmer housing, but none in which the head is adjustable continuously as to height above the ground, and inclination of the plane of the rotating disc. For example in U.S. Pat. No. 4,453,372 to Remer, there are several different angular orientations possible, but only to the extent that there are milled slots in the mounting block. In U.S. Pat. No. 3,191,368 to Hidalgo, U.S. Pat. No. 3,193,996 to Wellborn, U.S. Pat. No. 3,693,334 to Lowery, U.S. Pat. No. 3,531,922 to Hansen, U.S. Pat. No. 3,236,037 to Porterfield, and U.S. Pat. No. 3,604,208 to Borunda there is some adjustment in at least one direction, but the mountings are complicated and usually quite limited in their adjustability.

U.S. Pat. No. 3,693,334 dated Sep. 26, 1972 to Lowery discloses a rotary lawn mower in combination with an edge trimmer in which a single power source is employed to drive both mechanisms. The edge trimmer is positioned on the upper surface of the mower housing and is adapted to pivot into a retracted position when not in use so that the mower is able to function in a normal manner.

U.S. Pat. No. 3,782,085 dated Jan. 1, 1974 to Rydin and Parker describes a rotary lawn mower including an engine wherein an edger-trimmer unit mounted on the mower and driven by the engine, power control means for engaging and disengaging the drive to the unit, and position control means for moving the unit between its edging and trimming positions.

U.S. Pat. No. 3,693,334 dated Sep. 26, 1972 to Lowery disclose a rotary lawn mower in combination with an edge trimmer in which a single power source is employed to drive both mechanisms. The edge trimmer is positioned on the upper surface of the mower housing and is adapted to pivot into a retracted position when not in use so that the mower is able to function in a normal manner.

U.S. Pat. No. 3,676,952 dated Jul. 18, 1972 to Watts delineate a dual-purpose lawn edging device which serves as a grass stop and a track for a lawn mower wheel. The device has a main strip and at least one side wall extending upwardly from one side edge of the strip with the side wall having a top ridge and an extension which extends downwardly from the ridge to define a supporting leg for the device which is adapted to be embedded in the ground to hold the device in position. The main strip is sufficiently wide to define the track and the sidewall serves as a guide for the wheel while allowing easy crossing thereover.

All the prior art attempts at constructing an edge trimmer or an edge cutter device have made the device cumbersome and complex. Some of these prior art machines have employed an edge trimming mechanism rigidly affixed to a mower housing, others have employed an extensible device. However both of these mounting methods have hampered the normal operation of the mower by having at least a portion of the edger mechanism permanently protruding from either the front or the side of the mower housing. If any portion of the edger mechanism is allowed to protrude from the mower housing, the mower cannot be employed to cut in corners or adjacent to structures such as buildings, fences, and the like.

In these respects, the adjustable sidekick trimmer device mounted on a tractor or a like vehicle for trimming the edges of lawn, according to the present invention, substantially departs from the conventional concepts and designs of the prior art, and in so doing provides a device primarily developed for the purpose of trimming and edging a grass lawn when assembled with a tractor or like vehicle. The adjustable sidekick trimmer device is inexpensive, easy to operate and requires little or no maintenance.

3. SUMMARY OF THE PRESENT INVENTION

Accordingly, the present invention is directed to an adjustable sidekick trimmer device mounted on a tractor or a like vehicle for trimming the edges of lawn that substantially obviates one or more of the problems due to limitations and disadvantages of the related art.

It is, therefore, an object of the present invention is to provide an adjustable sidekick trimmer device mounted on a tractor or a like vehicle for trimming the edges of lawn which is inexpensive, easy to operate and requires little or no maintenance.

It is another object of the present invention is to provide an adjustable sidekick trimmer device in which the height of the trimmer head can be set to any deck of a tractor having an adjustable mounting plate.

It is a further object of the present invention to provide an adjustable sidekick trimmer device in which the deck belt can be changed without taking the whole system apart upon removal of upper bearing.

It is another further object of the present invention to provide an adjustable trimmer device in which activation of the said device is carried out by pulling a control cable, made of steel, suitably connected to that device.

It is another further object of the present invention to provide an adjustable trimmer device in which no grass is missed during the device at work ensuring that trim work to be about a quarter of an inch shorter than that of the said deck blades resulting in a clean trim of grass.

It is yet another further object of the present invention to provide an adjustable trimmer device in which pushing a control cable "in" pulls the dual head idler pulley thereby disengaging the belt from the drive pulley mounted on the said trimmer head.

Still another further object of the present invention to provide an adjustable trimmer device having a control cable acting as a brake stopping the belt that runs the plurality of trimmer blades/cutters and the trimmer head when a clutch including a spring is disengaged allowing the drive pulley to run freely inside the said belt.

Additional features and advantages of the invention will be set forth in the description which follows, and in part will be apparent from the description, or may be learned by practice of the present invention. The objectives and other advantages of the invention will be realized and attained by the structure particularly pointed out in description and claims hereof as well as appended drawings.

To achieve these and other advantages and in accordance with the purpose of the present invention, as embodied and broadly described, the adjustable sidekick trimmer device mounted on a tractor or a like vehicle for trimming the edges of lawn comprises:

a sidekick trimmer housing, the said sidekick housing being bolted to the mower deck of a tractor having an adjustable mounting plate with at least two inch bolts;

a trimmer head and locking nuts provided in the said housing for fastening purpose;

a main shaft on cutting end of the trimmer head, the lower end of the said shaft being threaded in such a fashion such that while unlocking two nuts, one on top and one on bottom of the trimmer head, the height of the trimmer head can be set adjustable for any deck;

two 90° support brackets with upper bearing for shaft support in which the opening between the said two brackets allows to change the deck belt without taking the whole system apart upon removal of upper bearing;

a plurality of replaceable trimmer blades/cutters and guide for the said trimmer blades, the said cutters under the deck being guided by the said guides allowing deck blades to overlap the said trimmer blades without touching in such a manner so that no grass is missed during the device at work ensuring that trim work to be about a quarter of an inch shorter than that of the said deck blades resulting in a clean trim of grass;

a 3-inch drive pulley that bolts to the said main shaft, the said pulley is located just below the said upper bearing and drives the said trimmer head, the said 3-inch drive pulley runs the plurality of the said trimmer blades;

a lower bearing bolted to the said sidekick trimmer housing for supporting the said main shaft;

an upper bearing and support brackets bolted to the said housing, the said 3-inch drive pulley being located below the said upper bearing that drives the said shaft;

a clutch assembly with a spring for engagement and disengagement of deck belt;

a control cable bolted to the right side of the said trimmer housing;

a 2-inch dual idler pulley having contact with the said deck belt that transmits power to the said trimmer head and the said clutch assembly pivotally connected with the said control cable;

one of a kind shaft that holds the dual idler pulley and welded to a mounting plate having at least three inch holes for receiving at least three inch bolts thereby sandwiching firmly mower deck, the said shaft and the said sidekick housing together;

an idler pulley and a shaft for the said idler pulley;

a steel plate cover enclosing the nut on the idler shaft;

a deck belt that runs the plurality of said cutters and the said trimmer head using the said 3-inch drive pulley and the said trimmer head being powered by the said deck belt mounted on the said 3-inch drive pulley; and the said control cable acting as a brake stopping the said belt when the said clutch is disengaged allowing the said drive pulley to run freely inside the said belt.

The adjustable sidekick trimmer device mounted on a tractor or a like vehicle for trimming the edges of lawn wherein the lower-end 2 inches of the said main shaft is machined in such a manner so that the said trimmer head can be set up on down with the locking nut.

The adjustable sidekick trimmer device mounted on a tractor or a like vehicle for trimming the edges of lawn wherein activation of the said 3-inch drive pulley is carried out by pulling the said control cable.

The adjustable sidekick trimmer device mounted on a tractor or a like vehicle for trimming the edges of lawn wherein pushing the control cable "in" actuates the said spring located in the said clutch assembly that pulls the said dual idler pulley away from the left thereby disengaging the said belt from the said trimmer head drive pulley by its loose contact.

The adjustable sidekick trimmer device mounted on a tractor or a like vehicle for trimming the edges of lawn wherein two guide pins are positioned next to the said dual idler pulley.

The adjustable sidekick trimmer device mounted on a tractor or a like vehicle for trimming the edges of lawn wherein the said housing is designed with openings for the belt in which the belt moves in and out of the housing and pulleys are covered by a steel plate top cover in the housing for safety purpose.

The adjustable sidekick trimmer device mounted on a tractor or a like vehicle for trimming the edges of lawn wherein the said 2-inch dual idler pulley is fabricated by suitably MIG welding two suitable single pulleys.

The adjustable sidekick trimmer device mounted on a tractor or a like vehicle for trimming the edges of lawn wherein the said belt is mounted on the said idler pulley.

The adjustable sidekick trimmer device mounted on a tractor or a like vehicle for trimming the edges of lawn wherein the said idler pulley shaft is installed from the bottom side of the mower deck.

The adjustable sidekick trimmer device mounted on a tractor or a like vehicle for trimming the edges of lawn wherein the said mower deck, the said main shaft and the said sidekick trimmer housing have at least three matching holes and the said three inch bolts sandwich them firmly.

The adjustable sidekick trimmer device mounted on a tractor or a like vehicle for trimming the edges of lawn wherein the clearance between the said 3-inch drive pulley and the said belt is ⅛-inch during actuation of the said control cable acting as a brake to stop the said trimmer head action.

The adjustable sidekick trimmer device mounted on a tractor or a like vehicle for trimming the edges of lawn wherein all the said belt and pulleys are enclosed in a closed housing for safety.

4. BRIEF DESCRIPTION OF THE DRAWINGS

The invention is described in the following in greater detail by way of an example with reference to the accompanying drawings in which:

FIG. 1 illustrates main shaft on cutting end of the trimmer. FIG. 1 also illustrates the trimmer head and nut. Lower-end 2 inches of the shaft is machined in such a manner so that the trimmer head can be set up on down with the locking nut.

FIG. 8 also illustrates the said 3-inch drive pulley located below the said upper bearing that drives the main shaft.

FIG. 23 illustrates the sidekick trimmer removing the top cover.

5. DESCRIPTION OF THE PREFERRED EMBODIMENT

Figure 1:
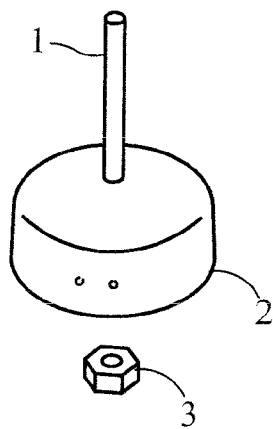

According to the present invention the adjustable sidekick trimmer device (23) mounted on a tractor (24) or a like vehicle for trimming the edges of lawn has a sidekick trimmer housing (9). The said sidekick housing (9) is bolted to the deck of a tractor (24) having an adjustable mounting plate (25) with at least two inch bolts. A trimmer head (2) and two trimmer-head locking nuts (3) are also provided in the said housing (9). The said housing (9) is designed with openings for the belt (14) in which the belt (14) moves in and out of the housing (9).

A main shaft (1) is located on cutting end, i.e., trimmer head (2) of the said trimmer device (23). The 2-inch lower end of the said main shaft (1) is threaded in such a fashion such that while unlocking two nuts (3), one on top and one on bottom of the trimmer head (2), the height of the trimmer head (2) can be set to any deck. The trimmer head (2) is a one of a kind head designed to screw up on down on lower end of the main shaft (1). It can be locked into place with the locking nut (1). This facilitates the adjustment function of the entire device (23) depending upon the cutting depth of grass.

There are two 90° support brackets (7) with bearing (6) for upper shaft support. The opening between the said two brackets (7) allows changing the deck belt (14) without taking the whole system apart upon removal of upper bearing (6).

There are a plurality of replaceable trimmer blades/cutters (4) and guide (not shown in drawings) for the said trimmer blades (4). The said cutters (4) under the deck are guided by the said guides (not shown in drawings) allowing deck blades (not shown in drawings) to overlap the said trimmer blades (4) without touching. This results in un-missed grass during the said device at work. The guide (not shown in drawings) also ensures that trim work to be about a quarter of an inch shorter than that of the said deck blades (not shown in drawings). Thus, the said adjustable sidekick trimmer device (23) results in a clean trim of grass during its operation. Deck belt (14) runs the plurality of said cutters (4) and a trimmer head (2) using the 3-inch drive pulley (8) and the trimmer head is powered by the said deck belt (4) that is mounted on the said 3-inch drive pulley (8).

The said adjustable sidekick trimmer device (23) includes a 3-inches drive pulley (8). This pulley (8) is bolted to the shaft (1) driving the said pulley (8). The said pulley (8) is located just below the upper bearing (6). The said pulley (8) drives the cutting end of the trimmer device (23), i.e., the trimmer head (2), and also drives a plurality of trimmer blades/cutters (4). A 2-inch dual idler pulley (13) having a belt (14) mounted that transmits power to the trimmer head (2) and clutch assembly (10) with control cable (11) is also provided in the said trimmer housing (9). The said dual idler pulley (13) is fabricated by suitably welding two suitable single pulleys. As for an example the process of welding may be MIG welding. Other suitable welding processes may also be adopted. A shaft (20) is provided to mount the idler pulley (21). A steel plate cover (22) encloses the locking nut (3) provided on the said shaft (20). Two guide pins (16) are positioned next to idler pulley (21). A belt (14) is mounted on the said idler pulley (21). Pulleys (8, 13, 21) are covered by a top-cover (22) on the said housing (9) for safety purpose.

The said trimmer device (23) also includes a shaft (17). The said shaft (17) holds the dual idler pulley (13). The said shaft (17) is welded to a mounting plate (18). The mounting plate (18) has at least three inch holes (19) for receiving at least three inch bolts which sandwiches firmly mower deck (not shown in drawings), the said shaft (17) and the said sidekick trimmer housing (9) together. The said mower deck, shaft (17) and sidekick trimmer housing (9) have matching holes (19) and the said three inch bolts sandwich them.

There is a lower bearing (5) bolted to sidekick trimmer housing (9) for supporting the said main shaft (1). The upper bearing (6) and two 90° support brackets (7) are bolted to the trimmer housing (9).

A clutch assembly (10) with a spring (15) is provided in the device (23) for engagement and disengagement of deck belt (14). A control cable (11) acting as a brake stopping the said belt (14) when the said clutch (10) is disengaged allowing the said 3-inch drive pulley (8) to run freely inside the belt (14) is also included in the said device (23). A steel plate mounts the said clutch assembly (10) and spring (15) in the said sidekick trimmer housing (9). The clearance between the drive pulley (8) and the said belt (14) is ⅛ inch during actuation of the said brake to stop the said trimmer head (2) action when required.

A control cable (11) made of steel is bolted to the right side of the said trimmer housing (9). Activation of the said 3-inch drive pulley (8) is carried out by pulling the said control cable (11). Pushing the control cable (11) "in" actuates a spring (15) located at the clutch assembly (10) that pulls the dual idler pulley (13) away from the left thereby disengaging the belt (14) from the drive pulley (8) mounted on main shaft (1) by its loose contact.

It is to be understood, however, that although the characteristics and advantages of the present invention have been set forth in the foregoing description, the disclosure is illustrative only, and changes may be made in the arrangement of the parts within the scope of the appended claims.

Figure 2:
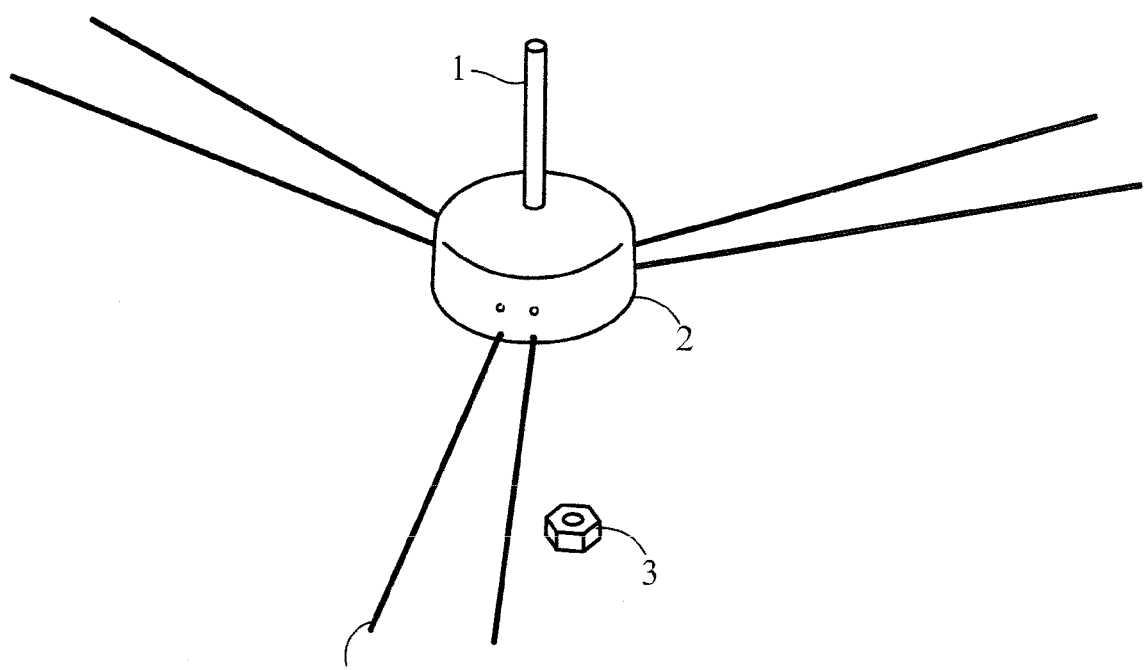
FIG. 2 illustrates trimmer head with four sets of cutters.
Figure 3:
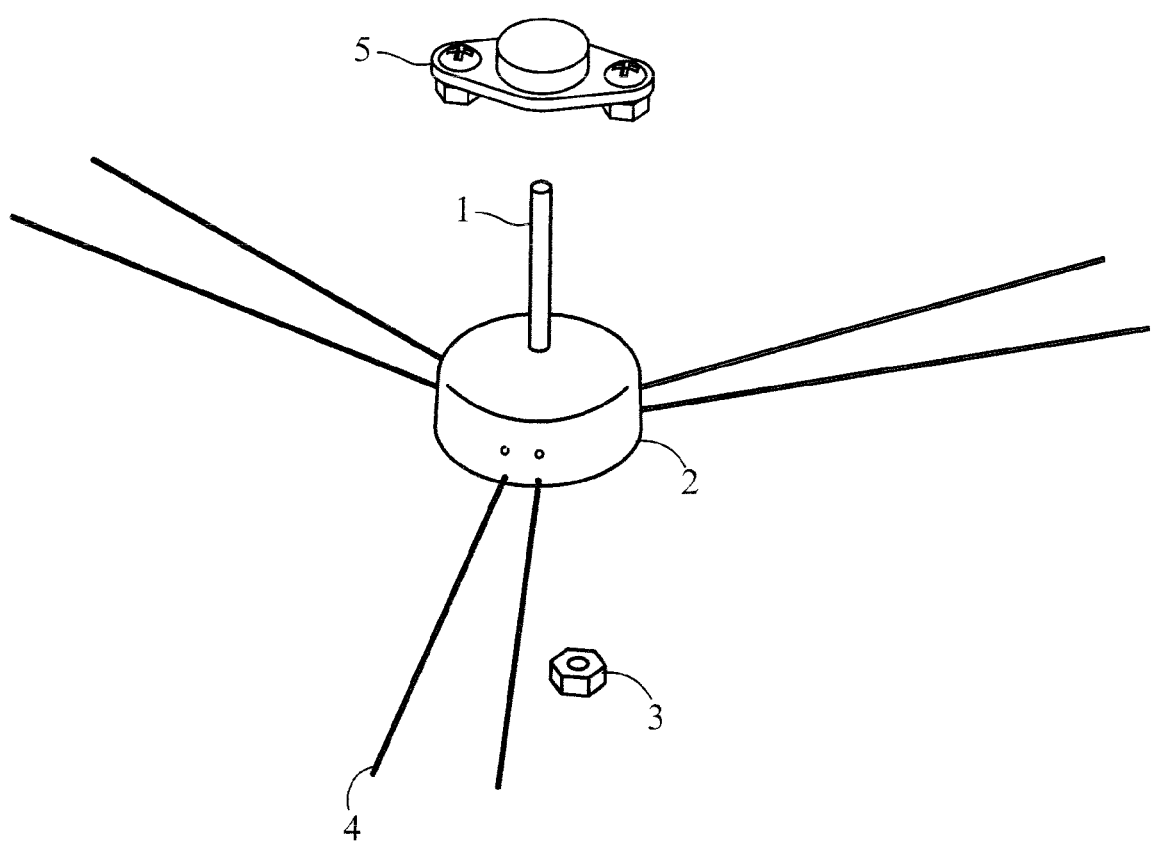
FIG. 3 illustrates lower shaft-support bearing.
Figure 4:
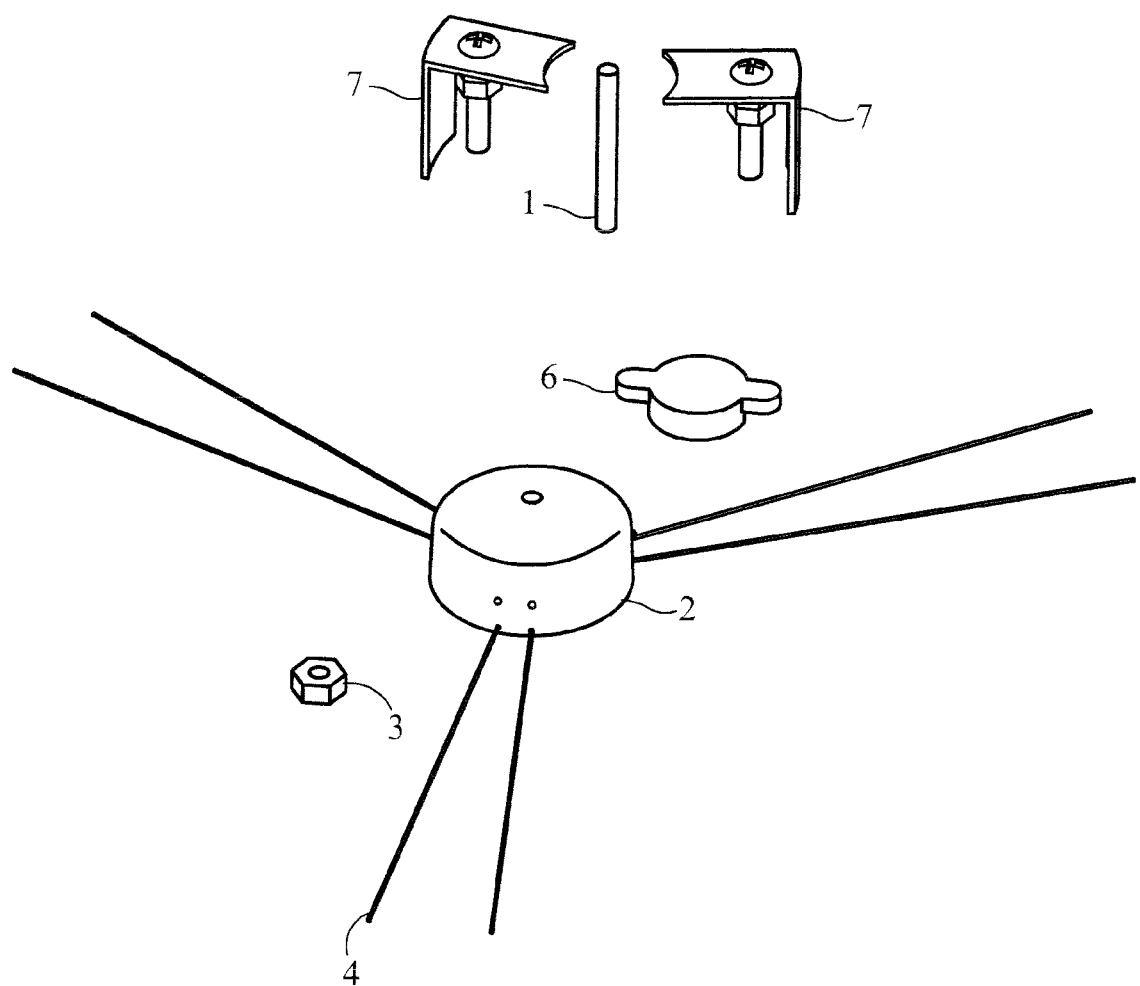
FIG. 4 illustrates brackets with bearing for upper shaft support.
Figure 5:
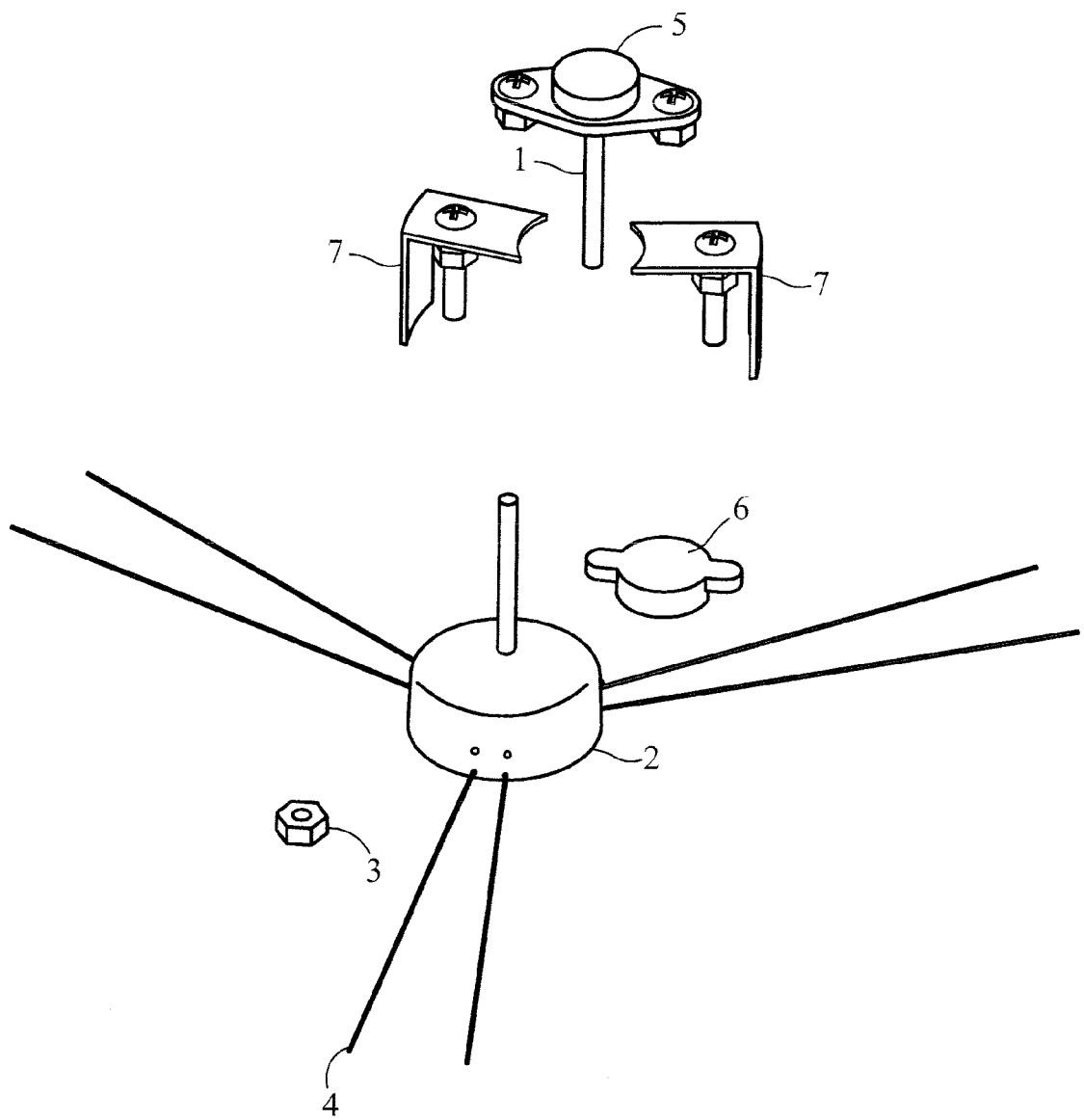
FIG. 5 illustrates the lower bearing mounted on the main shaft.
Figure 6:
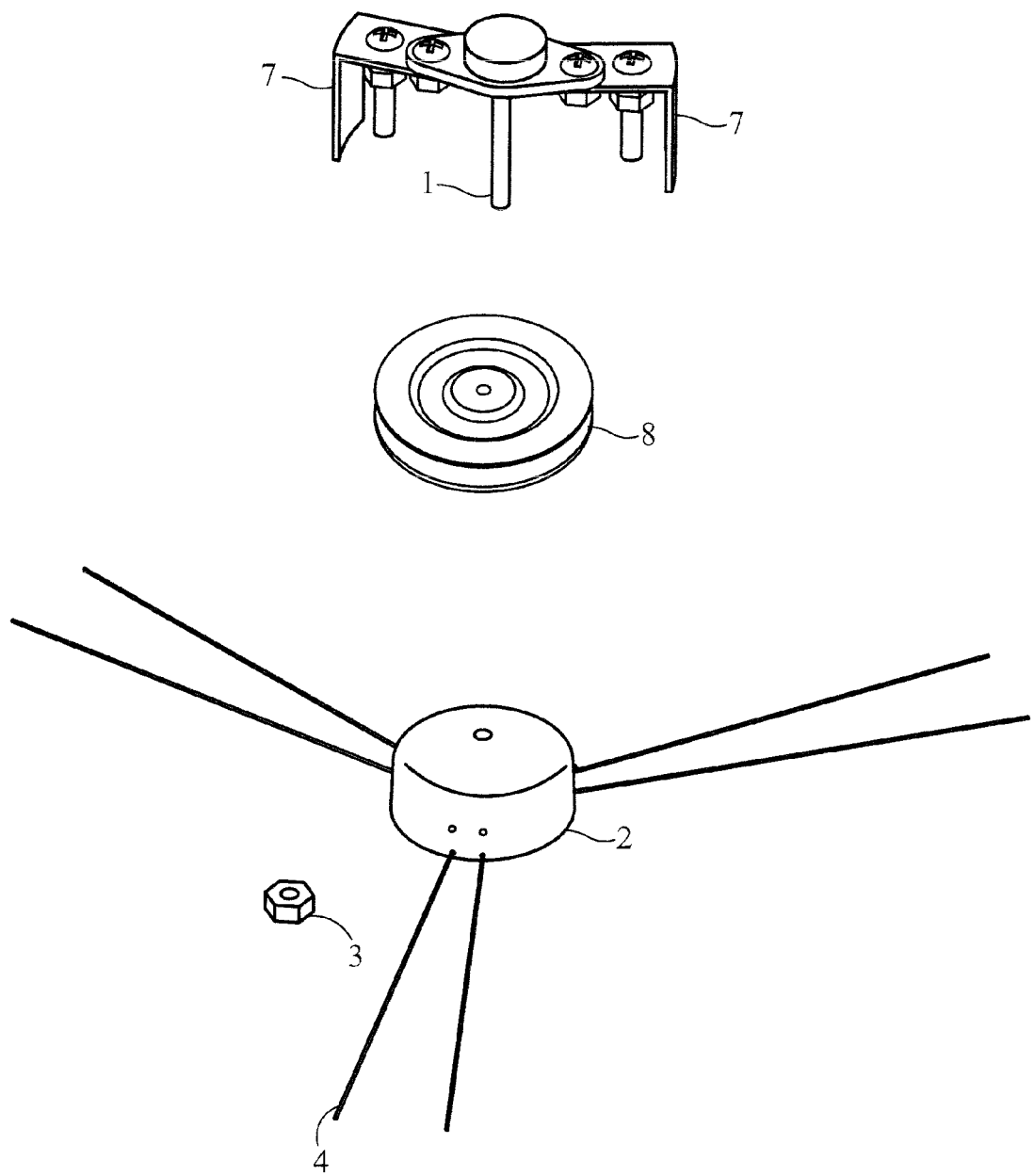
FIG. 6 illustrates a 3-inch drive pulley that bolts to the shaft. A pulley is there just below the upper bearing that drives the cutting end of the trimmer.
Figure 7:
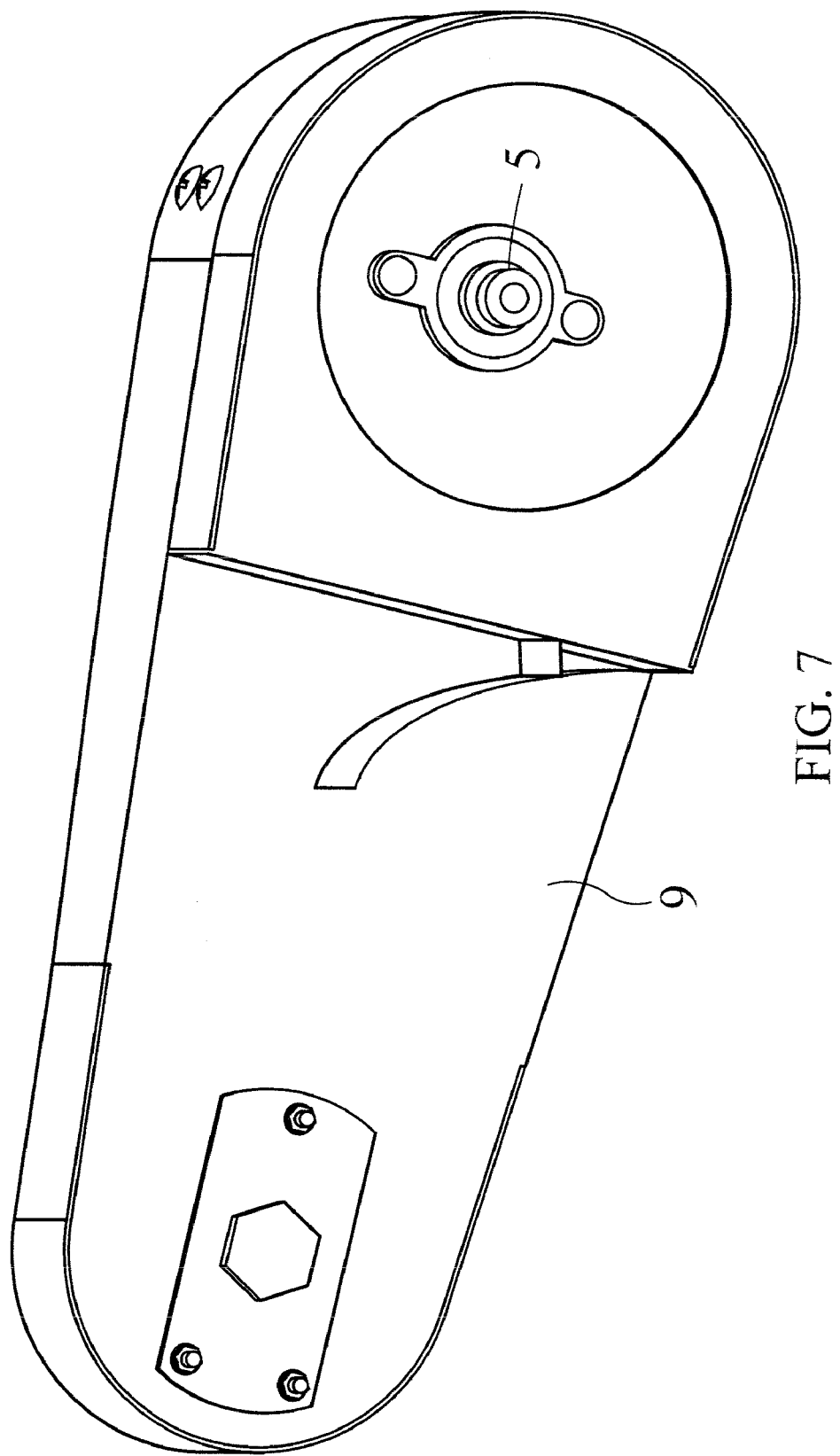
FIG. 7 illustrates lower bearing bolted to sidekick trimmer housing.
Figure 8:
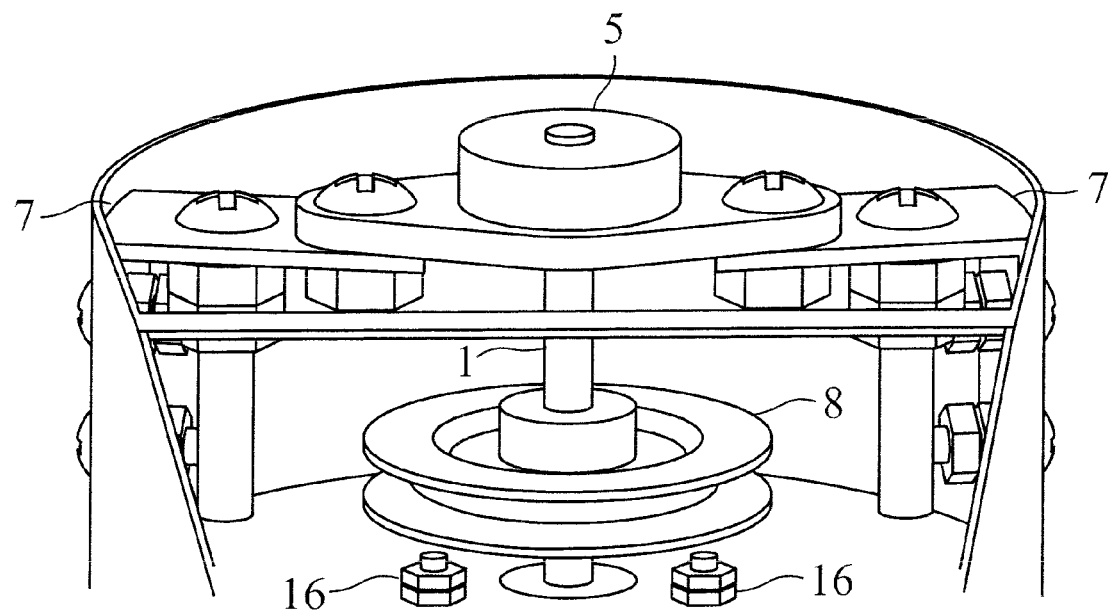
FIG. 8 illustrates an upper bearing and two support brackets bolted to the housing.
Figure 9:
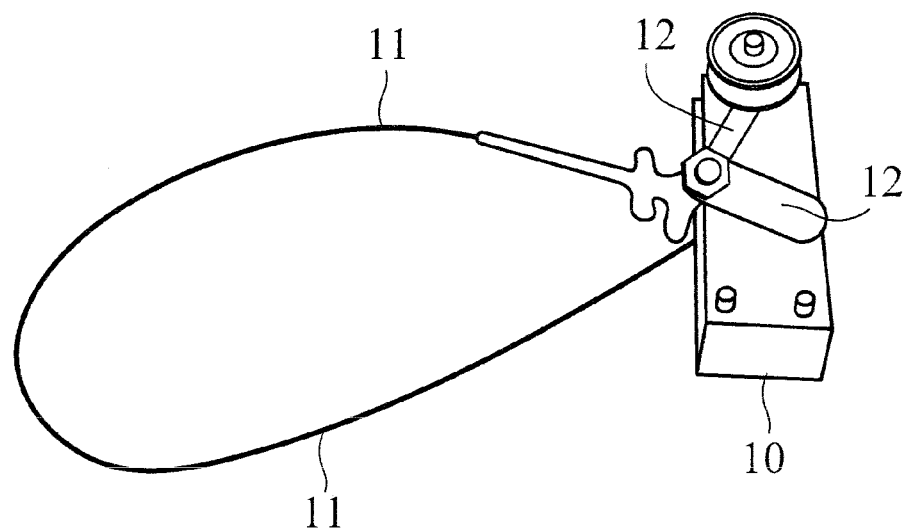
FIG. 9 illustrates clutch assembly that engages and disengages the trimmer head.
Figure 10:
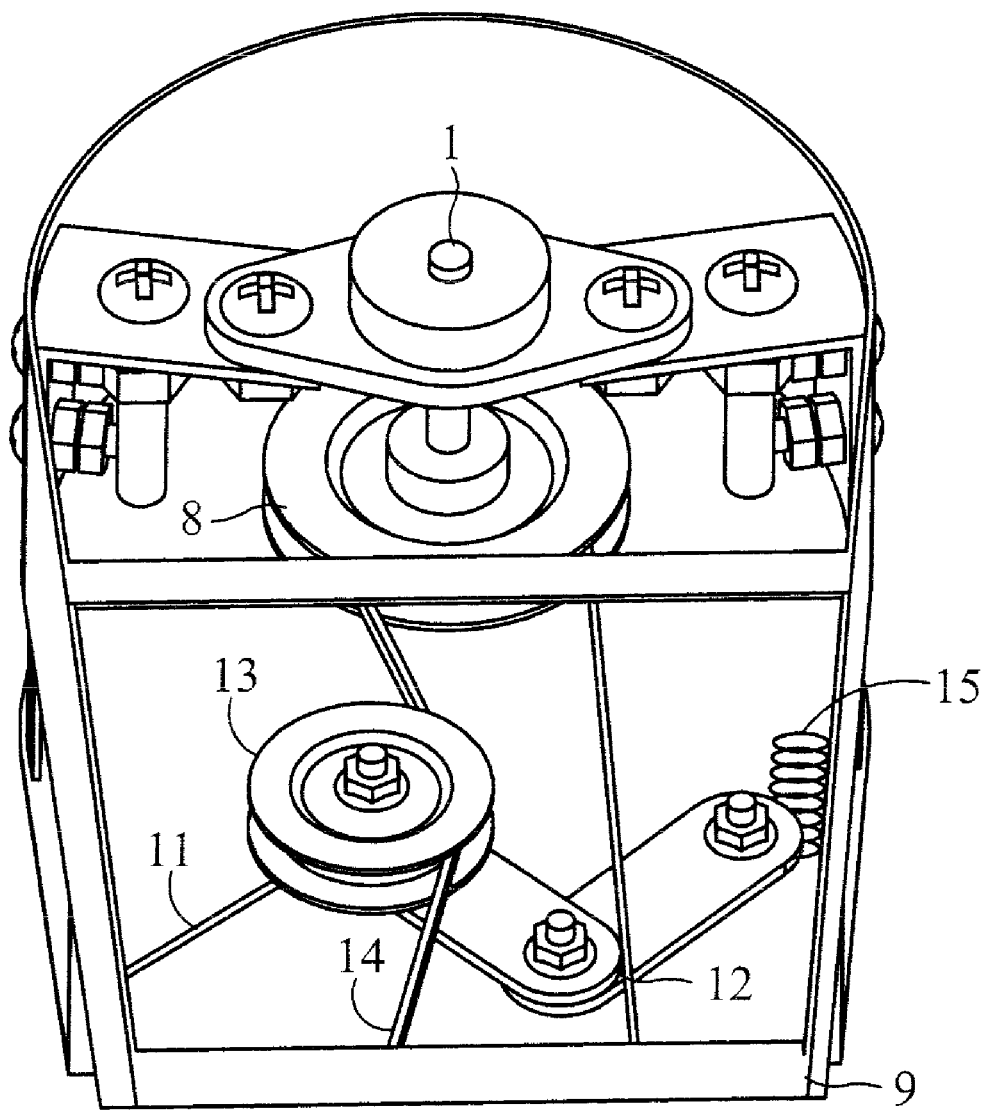
FIG. 10 shows the clutch assembly engaging the trimmer head.
Figure 11:
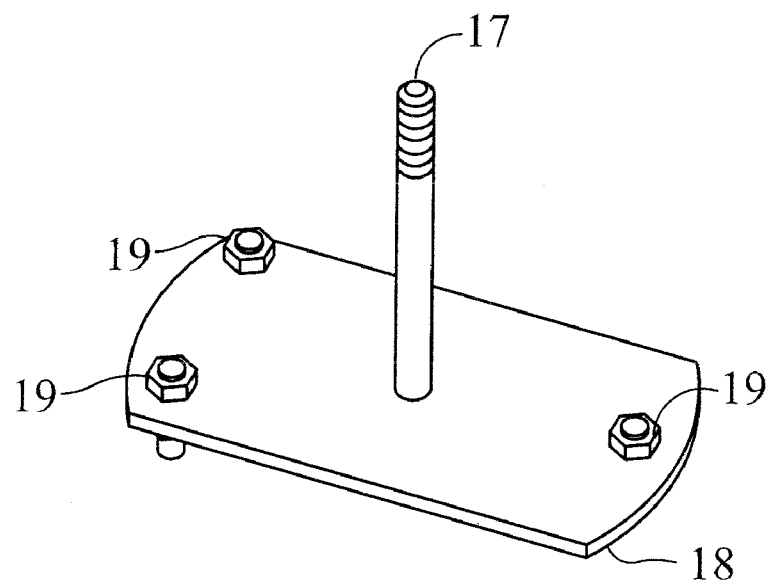
FIG. 11 shows one of a kind shaft that holds the dual idler pulley.
Figure 12:
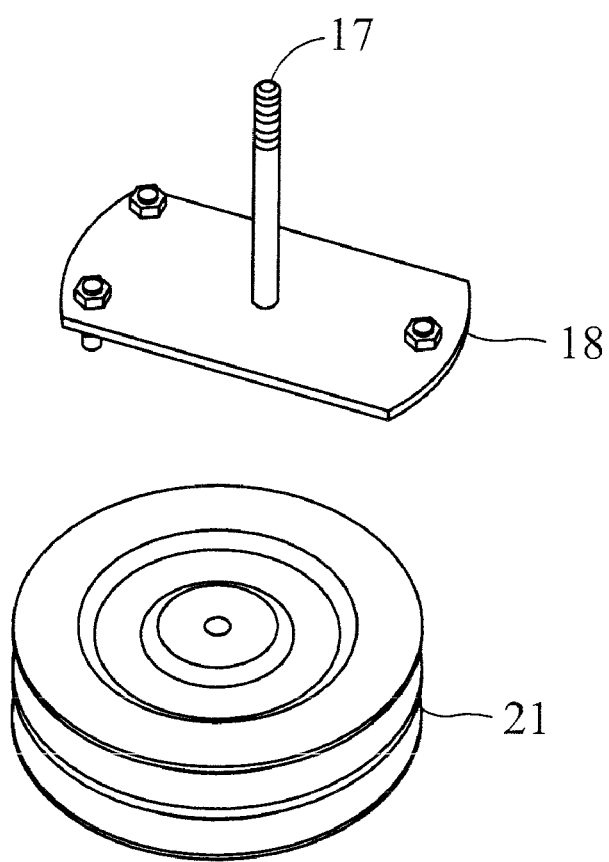
FIG. 12 illustrates dual idler pulley.
Figure 14:
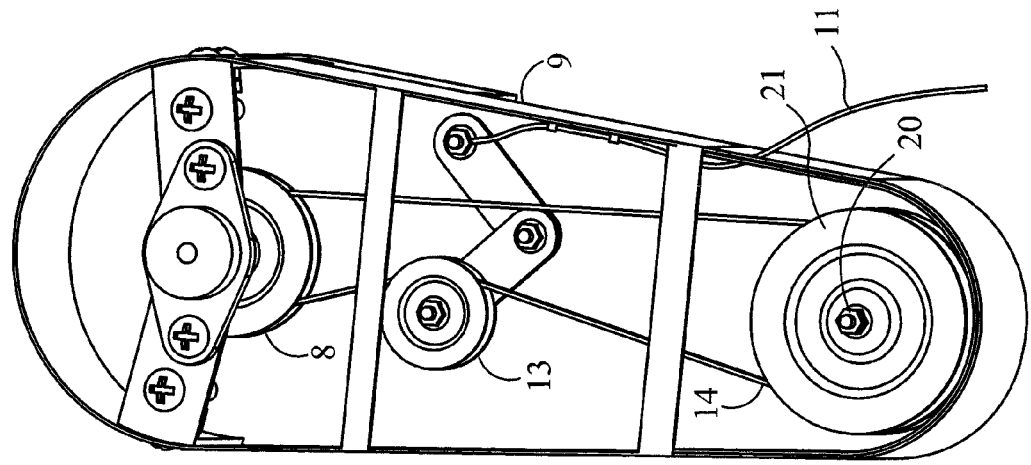
FIG. 14 shows the idler pulley.
Figure 13:
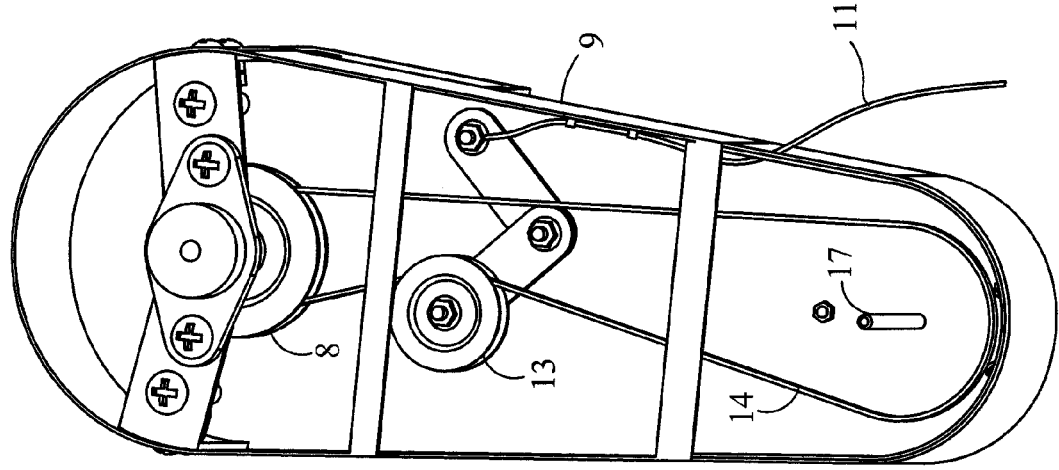
FIG. 13 illustrates the idler pulley shaft.
Figure 15:
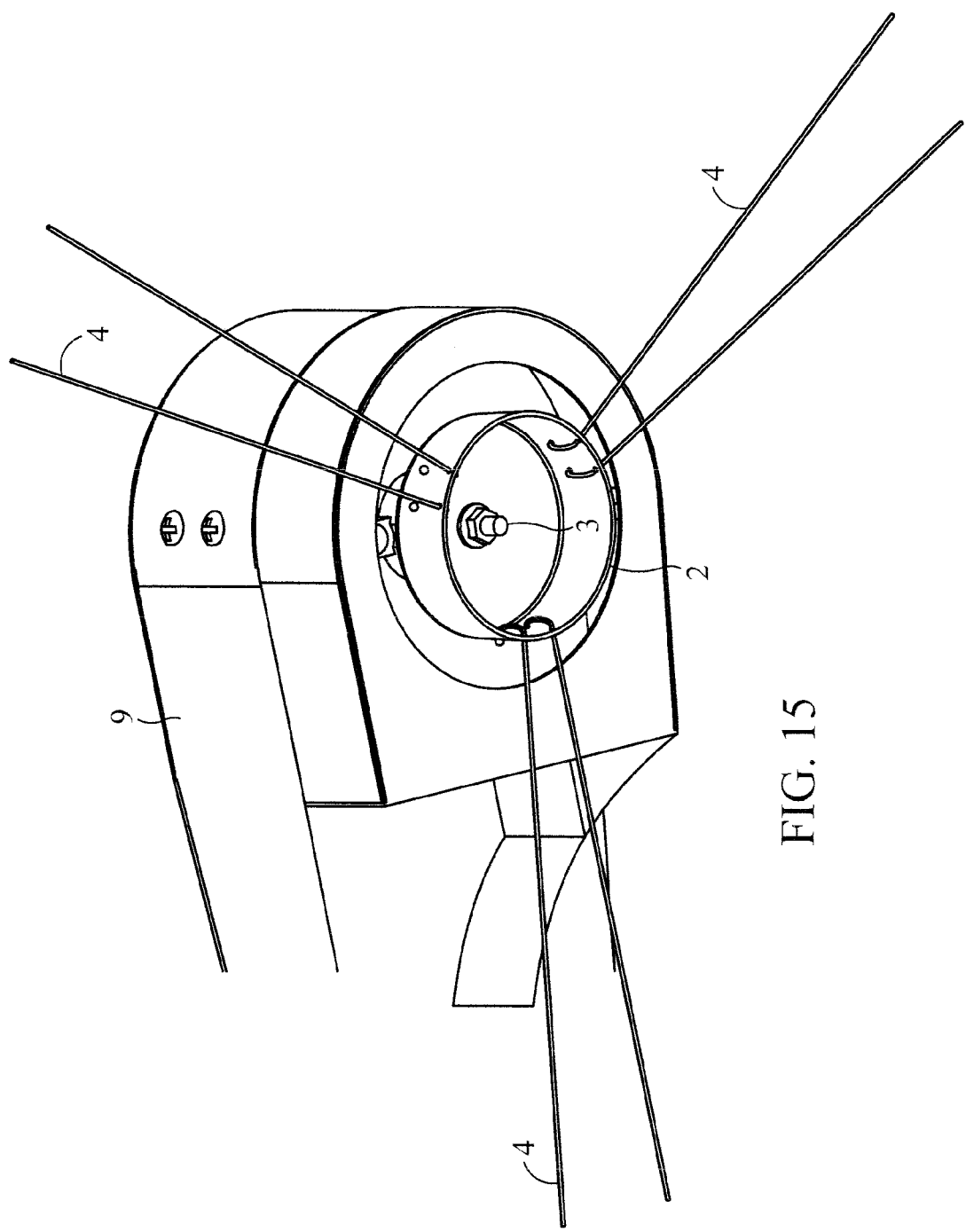
FIG. 15 illustrates the trimmer head with cutters locking nut installed on sidekick trimmer.
Figure 16:
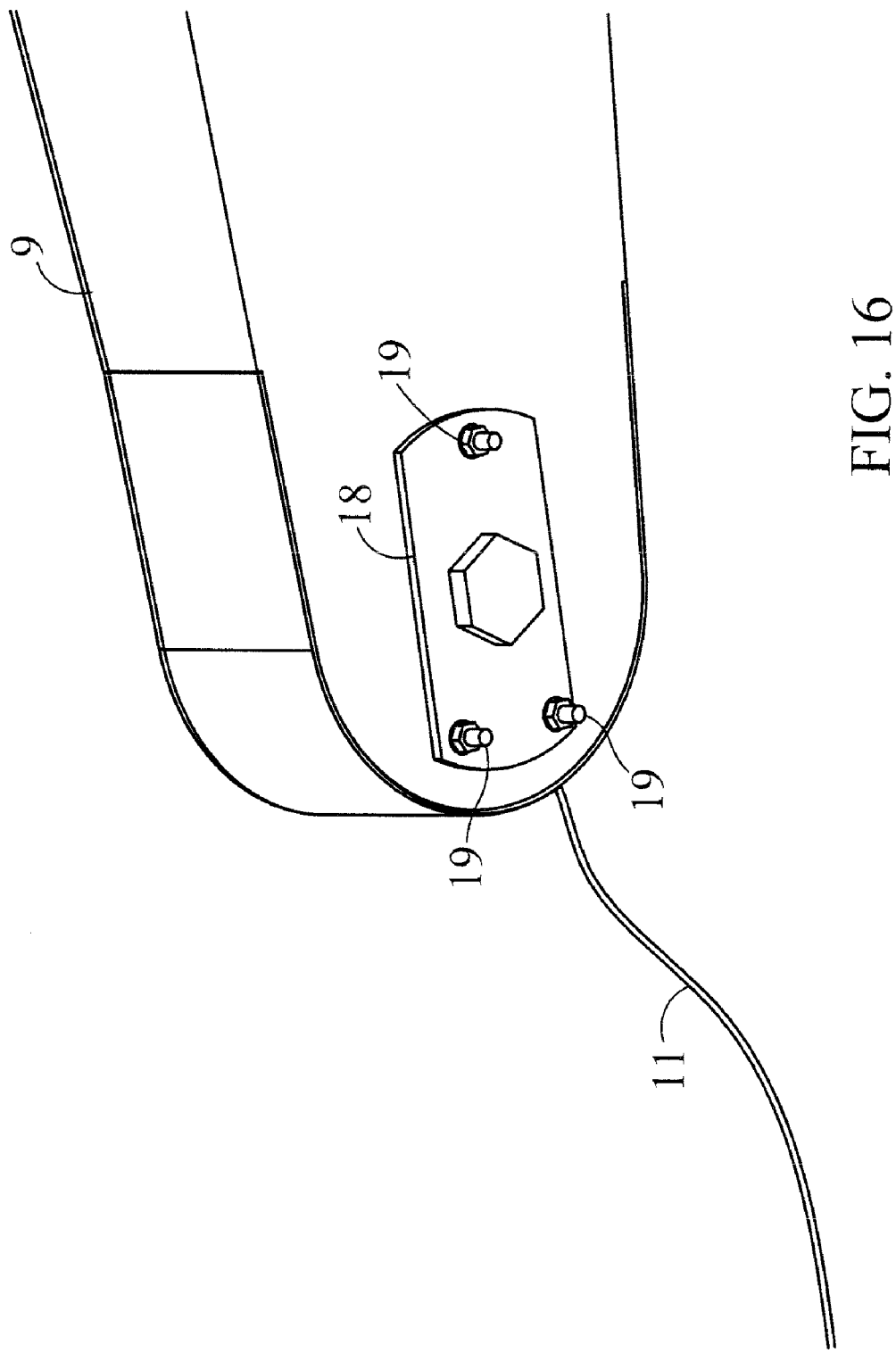
FIG. 16 shows idler shaft.
Figure 17:
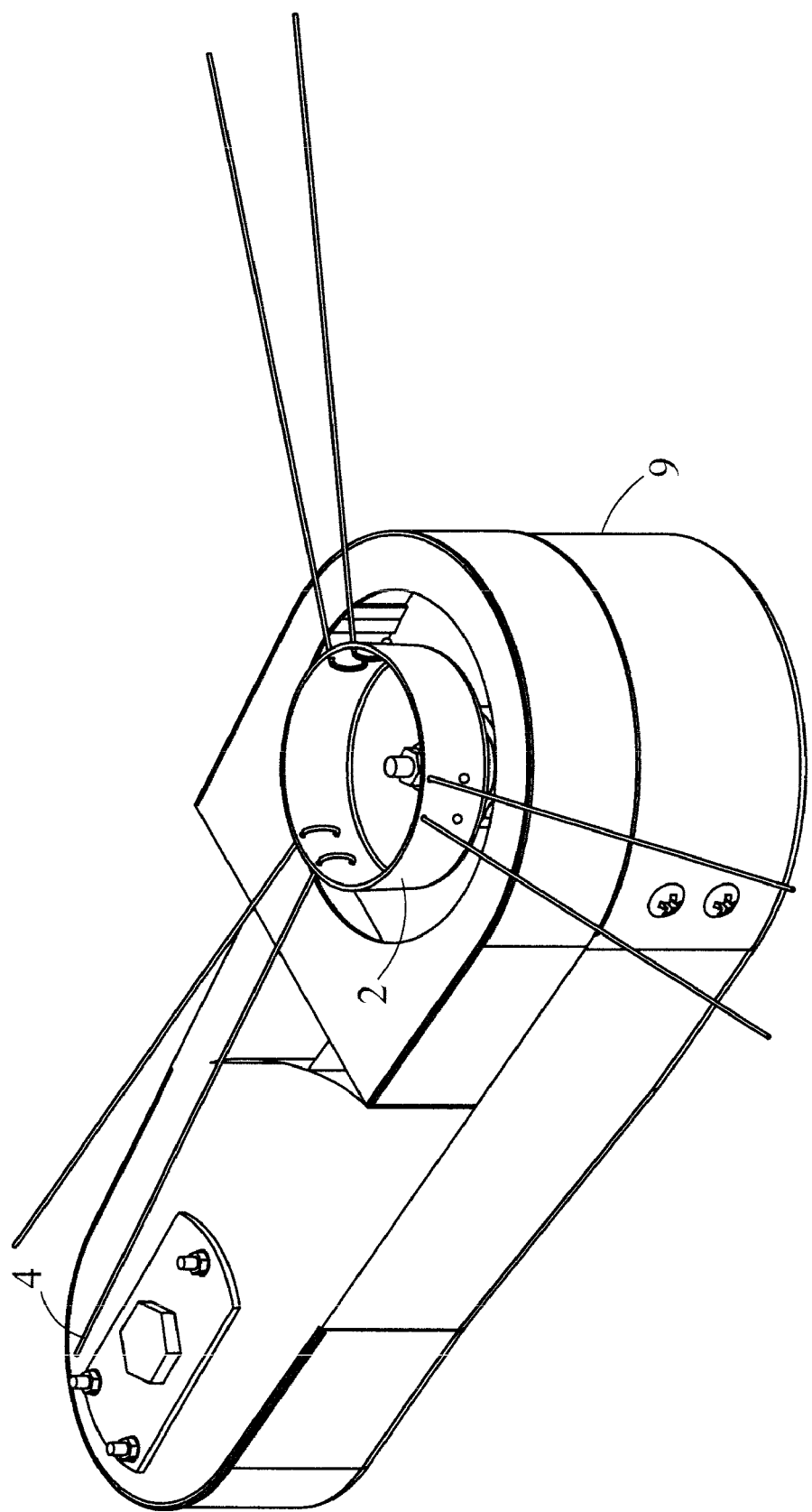
FIG. 17 shows the sidekick trimmer housing with access panels building the said housing.
Figure 18:
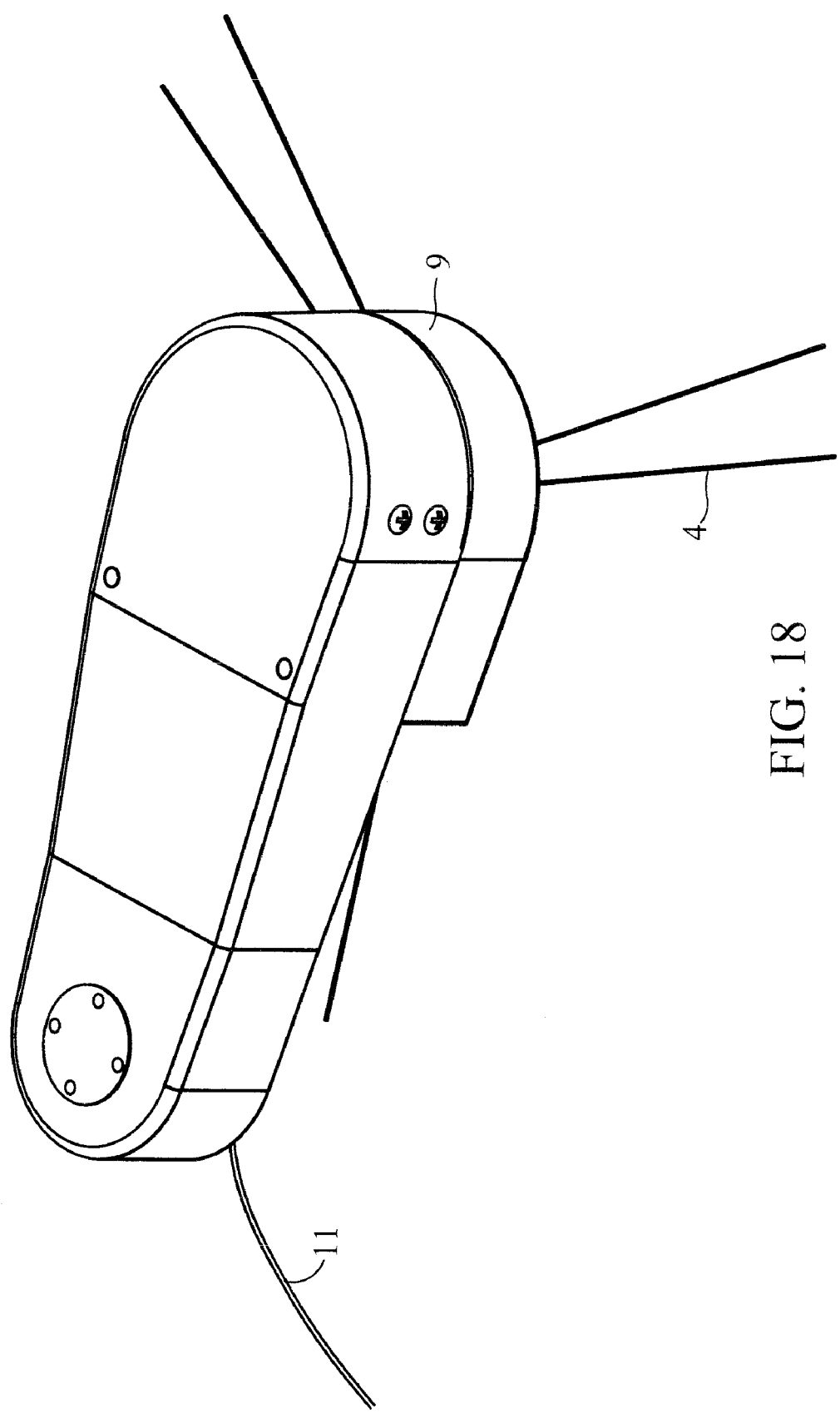
FIG. 18 is the top view of the trimmer housing.
Figure 19:
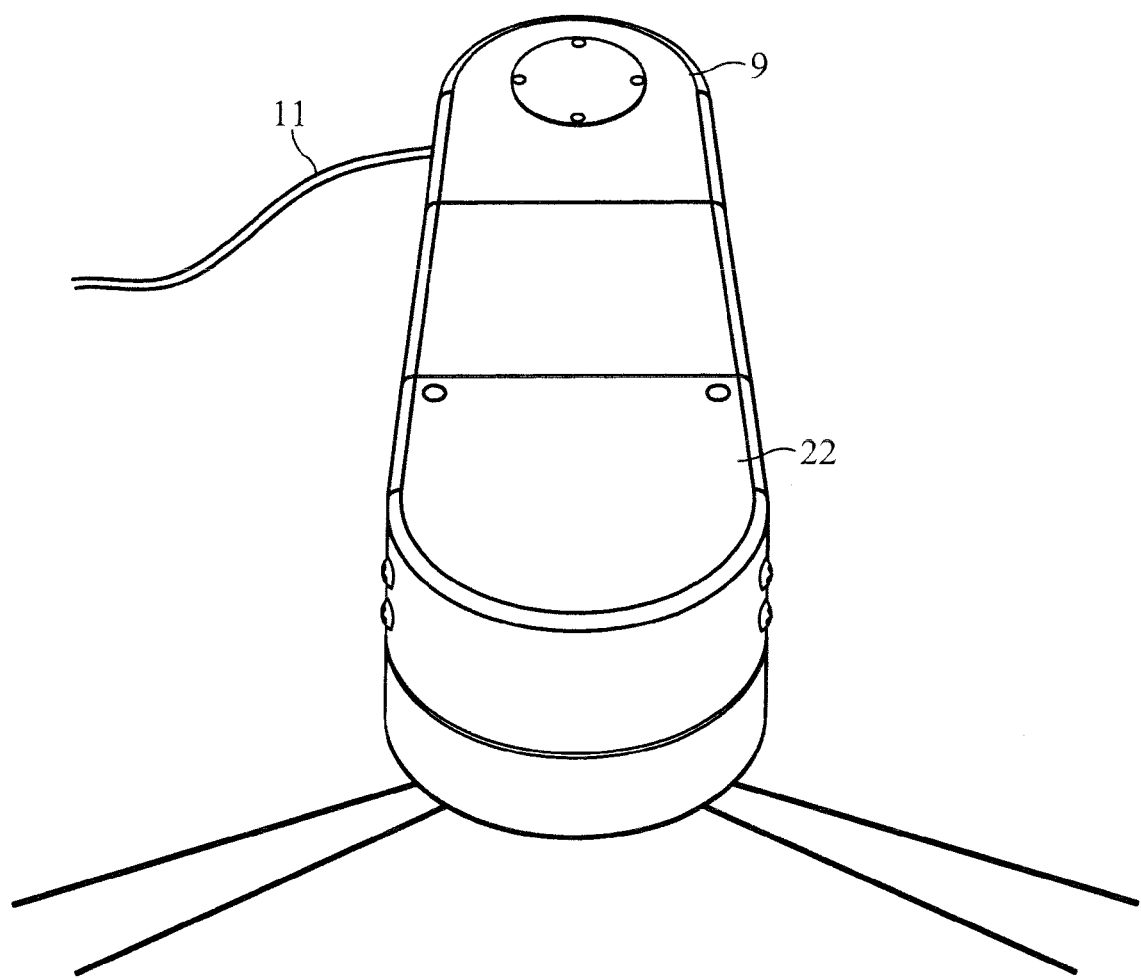
FIG. 19 shows a steel plate cover.
Figure 20:
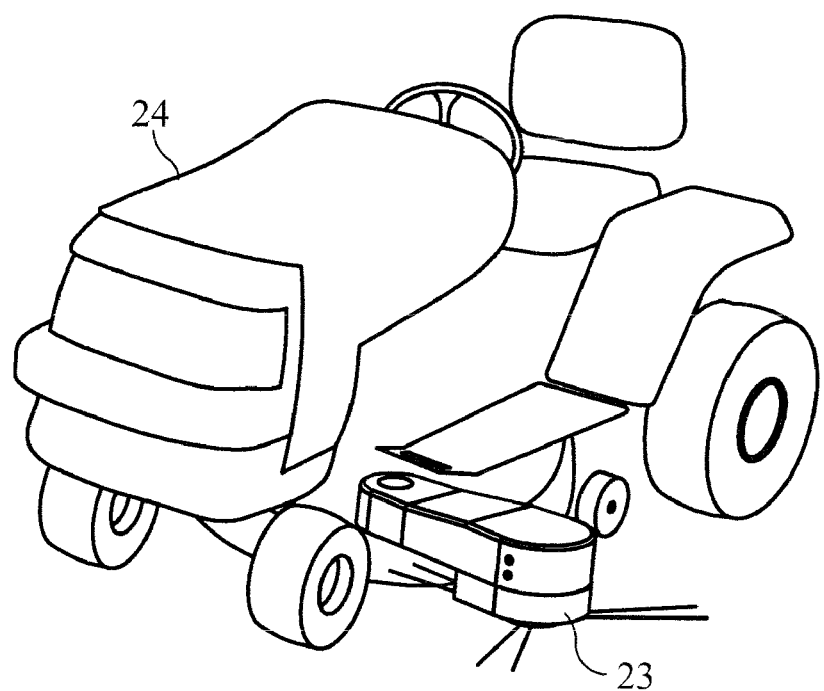
FIGS. 20 to 22 depict the sidekick trimmer mounted on a tractor.
Figure 21:
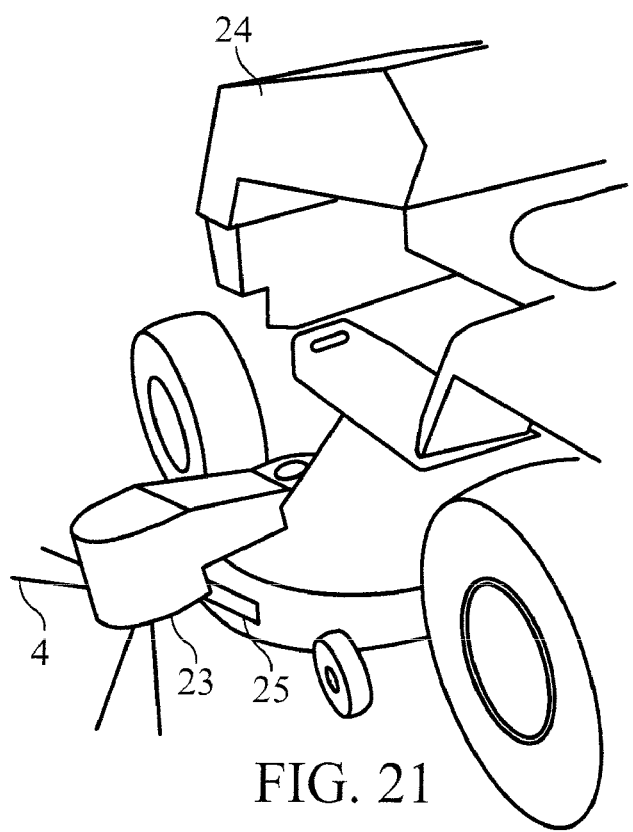
Figure 22:
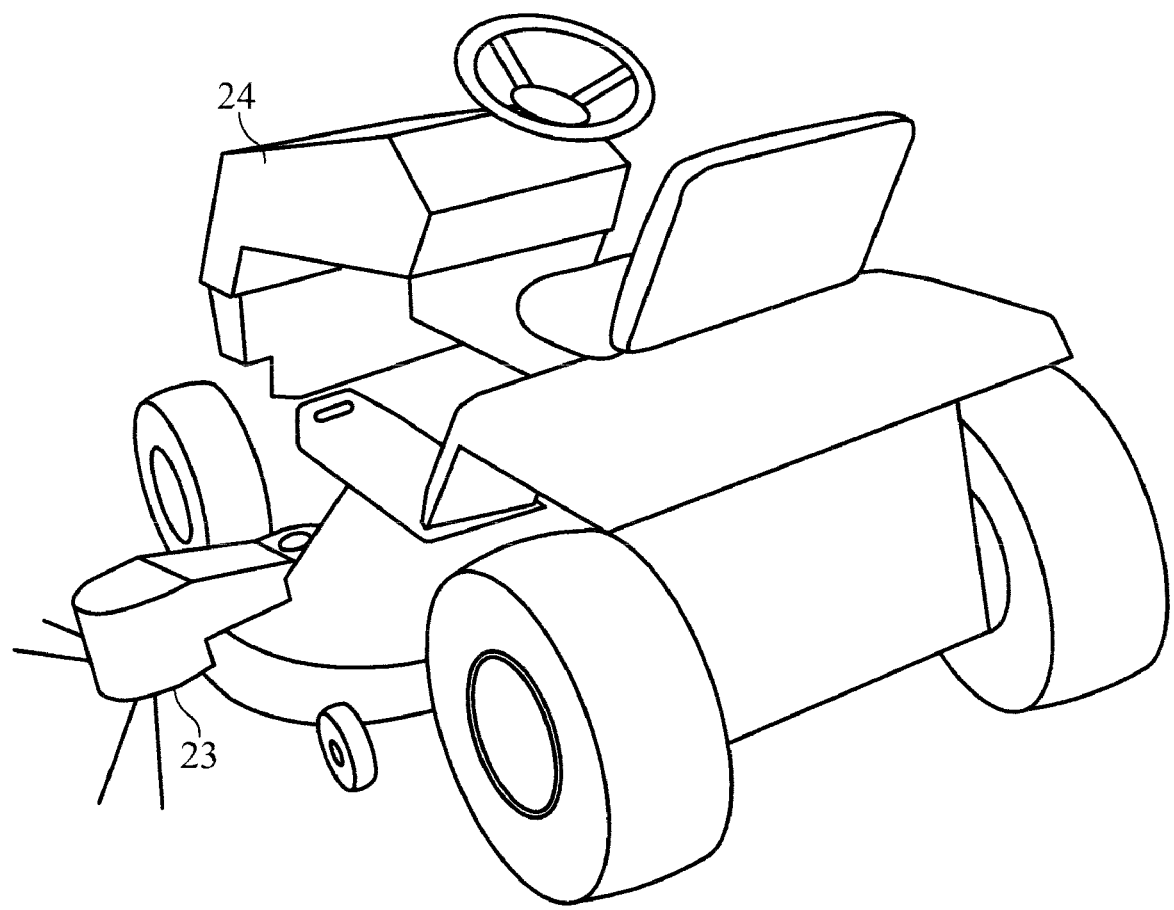

The reference numerals used in the FIGS. 1 to 23 are listed below:
1—Main shaft,
2—trimmer head,
3—trimmer locking nut,
4—cutters on trimmer head,
5—lower shaft-support bearing,
6—upper shaft-support bearing,
7—two 90-degree support brackets,
8—a 3-inch drive pulley,
9—sidekick trimmer housing,
10—clutch assembly,
11—control cable,
12—a bracket for pivoting,
13—a 2-inch pulley (dual idler pulley),
14—belt,
15—spring,
16—guide pins,
17—shaft for dual idler pulley,
18—mounting plate for dual idler pulley,
19—three inch holes for mounting plate,
20—idler pulley shaft,
21—idler pulley,
22—steel plate cover,
23—sidekick trimmer,
24—tractor,
25—adjustable mounting plate on tractor.

What is claimed is:

1. An adjustable sidekick trimmer device (23) mounted on a tractor (24) for trimming the edges of a lawn comprising:
   a sidekick trimmer housing (9), the said sidekick housing (9) being bolted to the mower deck of a tractor (24) having an adjustable mounting plate (25) with at least two inch bolts;
   a trimmer head (2) and locking nuts (3) provided in the said housing (9) for fastening purpose;
   a main shaft (1) on a cutting end of the trimmer head (9), the lower end of said shaft (1) being threaded such that while unlocking two nuts (3), one on top and one on bottom of the trimmer head (2), the height of the trimmer head (2) can be set adjustably for any deck;
   two 90° support brackets (7) with upper bearing (6) for shaft support in which the opening between said two brackets (7) allows changing of a deck belt (14) without taking the whole system apart upon removal of upper bearing (6);
   a plurality of replaceable trimmer blades (4) and guide for said trimmer blades (4), said trimmer blades (4) under the deck being guided by said guides allowing deck blades to overlap said trimmer blades (4) without touching so that no grass is missed while the device (23) is at work ensuring that trim work is about a quarter of an inch shorter than that of said deck blades resulting in a clean trim of grass;
   a 3-inch drive pulley (8) that bolts to said main shaft (1), said pulley (8) is located just below said upper bearing (6) and drives said trimmer head (2), said 3-inch drive pulley (8) runs the plurality of said trimmer blades (4);
   a lower bearing (5) bolted to said sidekick trimmer housing (9) for supporting said main shaft (1);
   an upper bearing (6) and support brackets (7) bolted to said housing (9), said 3-inch drive pulley (8) being located below said upper bearing (6) that drives said shaft (1);
   a clutch assembly (10) with a spring (15) for engagement and disengagement of said deck belt (14);
   a control cable (11) bolted to a right side of said trimmer housing (9);
   a 2-inch dual idler pulley (13) having contact with said deck belt (14) that transmits power to said trimmer head (2) and said clutch assembly (10) is pivotally connected with said control cable (11);
   a shaft (17) that holds said dual idler pulley (13) and is welded to a mounting plate (18) having at least three inch holes (19) for receiving at least three inch bolts thereby firmly sandwiching said mower deck of said tractor (24), said shaft (17) and said sidekick housing (9) together;
   an idler pulley (21) and an idler shaft (20) for said idler pulley (21);
   a steel plate cover (22) enclosing a nut on said idler shaft (20);
   a deck belt (14) that runs the plurality of said trimmer blades (4) and said trimmer head (2) using said 3-inch drive pulley (8) and said trimmer head (2) being powered by said deck belt (14) mounted on said 3-inch drive pulley (8); and
   said control cable (11) acting as a brake stopping said belt (14) when said clutch (10) is disengaged allowing said drive pulley (8) to run freely inside said deck belt (14).

2. The sidekick trimmer (23) according to claim 1, wherein the lower-end 2-inch of said main shaft (1) is machined in such a manner so that said trimmer head (2) can be set up or down with said locking nut (3).

3. The sidekick trimmer (23) according to claim 1, wherein said control cable (11) is connected to said two 90° support brackets (7) that pivot at the center.

4. The sidekick trimmer (23) according to claim 1, wherein said 3-inch drive pulley (8) activates on the left side of said housing (9) thereby forcing said belts (14) to drive said trimmer head (2).

5. The sidekick trimmer (23) according to claim 4, wherein activation of said 3-inch drive pulley (8) is carried out by pulling said control cable (11).

6. The sidekick trimmer (23) according to claim 1, wherein pushing the said control cable (11) in actuates said spring (15) located in said clutch assembly (10) that pulls said dual idler pulley (13) away from the left thereby disengaging said belt (14) from said trimmer head drive pulley (8) by its loose contact.

7. The sidekick trimmer (23) according to claim 6, wherein two guide pins (16) are positioned next to said dual idler pulley (13).

8. The sidekick trimmer (23) according to claim 1, wherein said housing (9) is designed with openings for said belt (14) in which said belt (14) moves in and out of said housing (9) and said pulleys (8, 13, 21) are covered by said steel plate top cover (22) in said housing (9) for safety purpose.

9. The sidekick trimmer (23) according to claim 1, wherein said 2-inch dual idler pulley (13) is fabricated by suitably MIG welding two suitable single pulleys.

10. The sidekick trimmer (23) according to claim 1, wherein said belt (14) is mounted on said idler pulley (21).

11. The sidekick trimmer (23) according to claim 1, wherein said idler pulley shaft (20) is installed from bottom side of said mower deck.

12. The sidekick trimmer (23) according to claim 1, wherein said mower deck, said shaft (17) and said sidekick trimmer housing (9) have at least three matching holes (19) and said three inch bolts sandwich them firmly.

13. The sidekick trimmer (23) according to claim 1, wherein clearance between said 3-inch drive pulley (8) and said belt (14) is ⅛ inch during actuation of said control cable (11) acting as a brake to stop said trimmer head (2) action.

14. The sidekick trimmer (23) according to claim 1, wherein said belt (14) and said pulleys (8, 13, 21) are enclosed in said closed housing (9) for safety.

\* \* \* \* \*